(12) United States Patent
Giuseppe et al.

(10) Patent No.: US 12,026,284 B2
(45) Date of Patent: Jul. 2, 2024

(54) SYSTEM AND METHOD FOR FACILITATING A SECURE ACCESS TO A PHOTOGRAPH OVER A SOCIAL NETWORKING PLATFORM

(71) Applicant: HCL Technologies Italy S.p.A, Vimodrone (IT)

(72) Inventors: Longobardi Giuseppe, Via Pio Emanuelli (IT); Grillo Maria Valentina, Via Pio Emanuelli (IT); Massino Maria Elena, Via Pio Emanuelli (IT); Solida Francesca, Via Pio Emanuelli (IT)

( * ) Notice: Subject to any disclaimer, the term of this patent is extended or adjusted under 35 U.S.C. 154(b) by 938 days.

(21) Appl. No.: 16/195,878

(22) Filed: Nov. 20, 2018

(65) Prior Publication Data

US 2020/0159963 A1 May 21, 2020

(51) Int. Cl.
*G06F 21/00* (2013.01)
*G06F 21/62* (2013.01)
(Continued)

(52) U.S. Cl.
CPC ........ *G06F 21/6263* (2013.01); *G06T 3/0093* (2013.01); *H04W 12/033* (2021.01); *G06K 9/00288* (2013.01); *H04L 51/32* (2013.01)

(58) Field of Classification Search
CPC ............. G01N 15/147; G01N 15/1475; G01N 15/1429; G01N 2015/1497; G06F 21/36;
(Continued)

(56) References Cited

U.S. PATENT DOCUMENTS 8,098,904 B2   1/2012   Ioffe et al.
8,744,143 B2 * 6/2014   Chen ................... G06F 21/6245
                                                          382/118
(Continued)

FOREIGN PATENT DOCUMENTS

CN          106453385 A    2/2017

OTHER PUBLICATIONS

"Face/Off: Preventing Privacy Leakage From Photos in Social Networks" Ilia P, Polakis I, Athanasopoulos E, Maggi F, Ioannidis S. Oct. 2015.

*Primary Examiner* — Ghazal B Shehni
(74) *Attorney, Agent, or Firm* — Kendal Sheets

(57) ABSTRACT

Disclosed is a system for facilitating a secure access to a photograph over a social networking platform. A photograph receiving module may receive a photograph uploaded by an uploader. In one aspect, the photograph may comprise a set of human faces. It may be noted that each human face may be tagged with a person's name A determination module may determine the set of human faces from the photograph by using at least one facial recognition technique. The determination module may further determine a set of pixels pertaining to each human face of the set of human faces. The photograph transformation module may transform the photograph into a transformed photograph upon masking the set of human faces present in the photograph. In one aspect, the set of human faces may be masked by applying at least one algorithm on the set of pixels associated to each face. The photograph transformation module may further store metadata associated to the transformed photograph of the photograph. A relationship determination module may allow a downloader to access the transformed image and determine a relation between the downloader and one or more persons, tagged in the photograph, on a social networking platform. In one aspect, the relation may be determined upon referring (Continued)

to a set of predefined rules. A photograph displaying module may display a downloaded photograph either as the photograph or the transformed photograph to the downloader. In one aspect, the downloaded photograph may be displayed as the photograph upon unmasking one or more human faces of the set of human faces present in the photograph, when the relation is determined between the downloader and the one or more persons. The downloaded photograph may be displayed as the transformed photograph, when the relation is not determined between the downloader and the one or more persons thereby facilitating a secure access to the photograph over the social networking platform.

8 Claims, 6 Drawing Sheets

(51) Int. Cl.
    *G06T 3/00*     (2006.01)
    *H04W 12/033*     (2021.01)
    *G06K 9/00*     (2022.01)
    *H04L 51/52*     (2022.01)

(58) Field of Classification Search
CPC ............ G06F 21/31; G06F 2221/2133; G06F 21/6245; G06F 21/6263; H04W 12/033; G06K 9/002288; H04L 51/32
See application file for complete search history.

(56) References Cited

U.S. PATENT DOCUMENTS

| | | | |
|---|---|---|---|
| 9,298,931 B2 | 3/2016 | Ur et al. | |
| 9,582,681 B2 | 2/2017 | Mishra | |
| 2011/0202968 A1* | 8/2011 | Nurmi | G06F 21/10 |
| | | | 726/1 |
| 2013/0305383 A1 | 11/2013 | Garralda et al. | |
| 2015/0242638 A1* | 8/2015 | Bitran | G06F 21/6245 |
| | | | 726/26 |
| 2018/0336397 A1* | 11/2018 | Smith | G06K 9/00221 |

\* cited by examiner

SYSTEM AND METHOD FOR FACILITATING A SECURE ACCESS TO A PHOTOGRAPH OVER A SOCIAL NETWORKING PLATFORM

CROSS REFERENCE TO RELATED APPLICATIONS

This patent application does not claim priority from any application.

TECHNICAL FIELD

The present subject matter described herein, in general, relates to a method and system for facilitating a secure access to a photograph, comprising one or more faces of one or more persons, over a social networking platform.

BACKGROUND

With the wide diffusion of digital cameras (also included in portable devices such as smartphones tablets, notebooks) and daily use of social networks through internet, millions of photographs are created and shared every day though social networking platforms. Examples of the social networking platforms may include, but not limited to, WhatsApp™, Facebook™, Instagram™, Picasa™, Google Photo™. It may be noted that such photographs may be accessed by anyone through accessing the social networking platforms without any apparent control or protection.

Though there exists access control features with the social networking platforms, the issue arises when a photograph is being shared on a restrictive group out of which somebody from such restrictive group, by intention or without knowing, might broadcast the photograph, outside the restricted group, in any public forum including the social networking platforms. This becomes a violation of the privacy as the creator of the photograph might not give his/her consent to make his/her photograph public.

In addition to the above, sometimes people with mala fide intentions misuses the photographs exist in the public domain by morphing the faces and making the morphed photographs viral on the social networking platforms. Examples for misusing the photographs may include, but not limited to, pedophile, sexual harassment, privacy infringement, scoop against VIPs, and harassment. Thus, from the above, it may be understood that when a photograph has been made available over the network, it may be reused and misused, and there is no means to protect the content in terms of privacy for the people included in the photograph.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for facilitating a secure access to a photograph, comprising one or more faces of one or more persons, over a social networking platform and the concepts are further described below in the detailed description. This summary is not intended to identify essential features of the claimed subject matter nor is it intended for use in limiting the scope of the claimed subject matter.

In one implementation, a system for facilitating a secure access to a photograph, comprising one or more faces of one or more persons, over a social networking platform is disclosed. The system may comprise a processor and a memory coupled to the processor. The processor may execute a plurality of modules present in the memory. The plurality of modules may comprise a photograph receiving module, a determination module, a photograph transformation module, a relationship determination module, and a photograph displaying module. The photograph receiving module may receive a photograph uploaded by an uploader. In one aspect, the photograph may comprise a set of human faces. It may be noted that each human face may be tagged with a person's name. The determination module may determine the set of human faces from the photograph by using at least one facial recognition technique. The determination module may further determine a set of pixels pertaining to each human face of the set of human faces. The photograph transformation module may transform the photograph into a transformed photograph upon masking the set of human faces present in the photograph. In one aspect, the set of human faces may be masked by applying at least one algorithm on the set of pixels associated to each face. The photograph transformation module may further store metadata associated to the transformed photograph of the photograph. In one aspect, the metadata may facilitate to re-transform the transformed photograph to the photograph. It may be noted that the metadata may be stored in the transformed image. The relationship determination module may allow a downloader to access the transformed image and determine a relation between the downloader and one or more persons, tagged in the photograph, on a social networking platform. In one aspect, the relation may be determined upon referring to a set of predefined rules. The photograph displaying module may display a downloaded photograph either as the photograph or the transformed photograph to the downloader. In one aspect, the downloaded photograph may be displayed as the photograph upon unmasking one or more human faces of the set of human faces present in the photograph, when the relation is determined between the downloader and the one or more persons. The downloaded photograph may be displayed as the transformed photograph, when the relation is not determined between the downloader and the one or more persons thereby facilitating a secure access to the photograph over the social networking platform.

In another implementation, a method for facilitating a secure access to a photograph, comprising one or more faces of one or more persons, over a social networking platform is disclosed. In order to facilitate the secure access, a photograph uploaded by an uploader may be received. In one aspect, the photograph may comprise a set of human faces. It may be noted that each human face may be tagged with a person's name. Upon receipt of the photograph, the set of human faces and a set of pixels pertaining to each human face of the set of human faces may be determined. In one aspect, the set of human faces may be determined from the photograph by using at least one facial recognition technique. Subsequent to the determination of the set of human faces and the set of pixels, the photograph may be transformed into a transformed photograph upon masking the set of human faces present in the photograph. The set of human faces may be masked by applying at least one algorithm on the set of pixels associated to each face. Post transformation, metadata associated to the transformed photograph may be stored. In one aspect, the metadata facilitates to re-transform the transformed photograph to the photograph. In one aspect, the metadata may be stored in the transformed image. After the above configuration, when a downloader is allowed to access the transformed image, a relation between the downloader and one or more persons, tagged in the photograph, may be determined on a social networking platform. In one aspect, the relation may be determined upon referring to a set of predefined rules. Post determination of the relation, a downloaded photograph may be displayed either as the photograph or the transformed photograph to the downloader. The downloaded photograph is displayed as the photograph upon unmasking one or more human faces of the set of human faces present in the photograph, when the relation is determined between the downloader and the one or more persons. The downloaded photograph is displayed as the transformed photograph, when the relation is not determined between the downloader and the one or more persons thereby facilitating a secure access to the photograph over the social networking platform. In one aspect, the aforementioned method for facilitating the secure access to a photograph may be performed by a processor using programmed instructions stored in a memory of the system or embedded in a chip microcode.

In yet another implementation, non-transitory computer readable medium embodying a program executable in a computing device for facilitating a secure access to a photograph, comprising one or more faces of one or more persons, over a social networking platform is disclosed. The program may comprise a program code for receiving a photograph uploaded by an uploader, wherein the photograph comprises a set of human faces, and wherein each human face is tagged with a person's name. The program may comprise a program code for determining the set of human faces from the photograph by using at least one facial recognition technique, and a set of pixels pertaining to each human face of the set of human faces. The program may comprise a program code for transforming the photograph into a transformed photograph upon masking the set of human faces present in the photograph, wherein the set of human faces is masked by applying at least one algorithm on the set of pixels associated to each face. The program may comprise a program code for storing metadata associated to the transformed photograph, wherein the metadata facilitates to re-transform the transformed photograph to the photograph, and wherein the metadata is stored in the transformed image. The program may comprise a program code for allowing a downloader to access the transformed image. The program may comprise a program code for determining a relation between the downloader and one or more persons, tagged in the photograph, on a social networking platform, wherein the relation is determined upon referring to a set of predefined rules. The program may comprise a program code for displaying a downloaded photograph either as the photograph or the transformed photograph to the downloader, wherein the downloaded photograph is displayed as the photograph upon unmasking one or more human faces of the set of human faces present in the photograph, when the relation is determined between the downloader and the one or more persons, and wherein the downloaded photograph is displayed as the transformed photograph, when the relation is not determined between the downloader and the one or more persons thereby facilitating a secure access to the photograph over the social networking platform.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
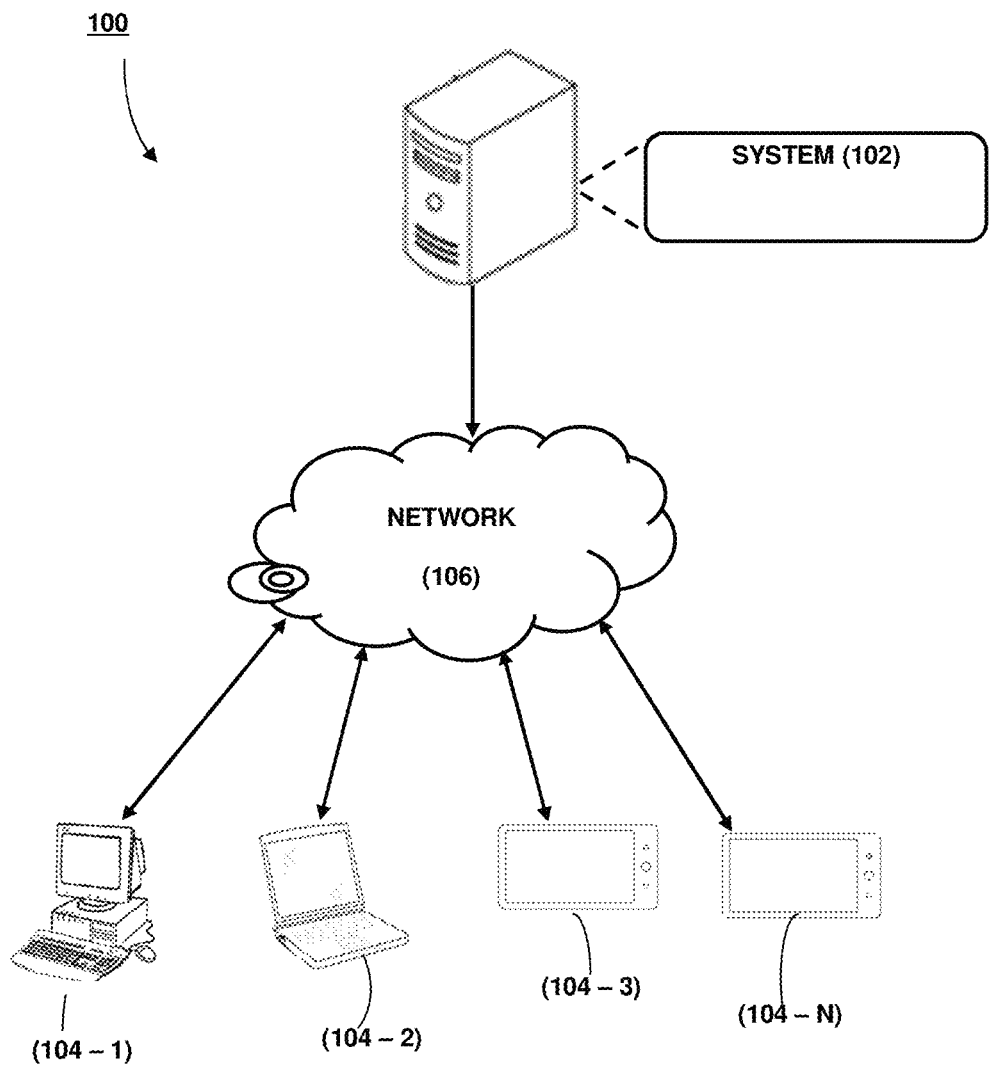
FIG. 1 illustrates a network implementation of a system for facilitating a secure access to a photograph, comprising one or more faces of one or more persons, over a social networking platform, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

It would be useful to obscure the vision of certain subjects within a photograph, and to limit the vision of all the subjects in photographs to authorized people only. It may be noted that limiting the vision of all the subjects in the photographs only to the authorized people in accordance with a predefined rules including a familiarity criterion. As a result of which, a person who receives a photo might not be allowed to see all the content and moreover the receiver cannot in turn forward it "in clear format" without the explicit permission from the photographer or of the involved subjects in the photographs.

The proposed invention facilitates a secure access to a photograph, comprising one or more faces of one or more persons, over a social networking platform. The proposed invention allows publishing the photograph by making the one or more faces people present in the photograph not recognizable. It may be noted that the one or more faces are made not recognizable by applying at least one algorithm on a set of pixels associated to each face of the one or more faces thereby transforming the photograph into a transformed photograph.

It may be noted that the at least one algorithm modifies that the set of pixels and alters the set of pixels according to some specific criteria. Upon transforming the photograph, metadata associated to the transformed photograph may be stored which may be referred while reconstructing the photograph (that was originally uploaded) upon re-transforming the transformed photograph to the photograph. Based on the above transformation, the proposed invention automatically hides the one or more faces of present in the photograph that may not be visible to people who are unauthorized to access the photograph. It may be noted that the authorization may be provided based on a relationship between a person, intended to view the photograph from the social networking platform, and one or more persons present in the photograph.

Once the relation is determined between the person and at least one person present in the photograph and if the person is authorized to view the photograph, the proposed invention re-transforms the transformed image upon unmasking face [s] of the at least one person present in the photograph and thereby display the photograph containing unmasked face of the at least one person having the relationship with the person present in the photograph. While aspects of described system and method for facilitating the secure access to the photograph over the social networking platform may be implemented in any number of different computing systems, environments, and/or configurations, the embodiments are described in the context of the following exemplary system.

Referring now to FIG. 1, a network implementation 100 of a system 102 for facilitating a secure access to a photograph, comprising one or more faces of one or more persons, over a social networking platform is disclosed. In order to facilitate the secure access, the system 102 receives a photograph uploaded by an uploader. In one aspect, the photograph may comprise a set of human faces, and wherein each human face is tagged with a person's name. Upon receipt of the photograph, system 102 determines the set of human faces and a set of pixels pertaining to each human face of the set of human faces. In one aspect, the set of human faces may be determined from the photograph by using at least one facial recognition technique. Subsequent to the determination of the set of human faces and the set of pixels, the system 102 transforms the photograph into a transformed photograph upon masking the set of human faces present in the photograph. The set of human faces may be masked by applying at least one algorithm on the set of pixels associated to each face. Post transformation, the system 102 stores metadata associated to the transformed photograph. In one aspect, the metadata facilitates to re-transform the transformed photograph to the photograph. In one aspect, the metadata may be stored in the transformed image. After the above configuration, when a downloader is allowed to access the transformed image, the system 102 determines a relation between the downloader and one or more persons, tagged in the photograph, on a social networking platform. In one aspect, the relation may be determined upon referring to a set of predefined rules. Post determination of the relation, the system 102 displays a downloaded photograph either as the photograph or the transformed photograph to the downloader. The downloaded photograph is displayed as the photograph upon unmasking one or more human faces of the set of human faces present in the photograph, when the relation is determined between the downloader and the one or more persons. The downloaded photograph is displayed as the transformed photograph, when the relation is not determined between the downloader and the one or more persons thereby facilitating a secure access to the photograph over the social networking platform.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a IoT device, IoT gateway, portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
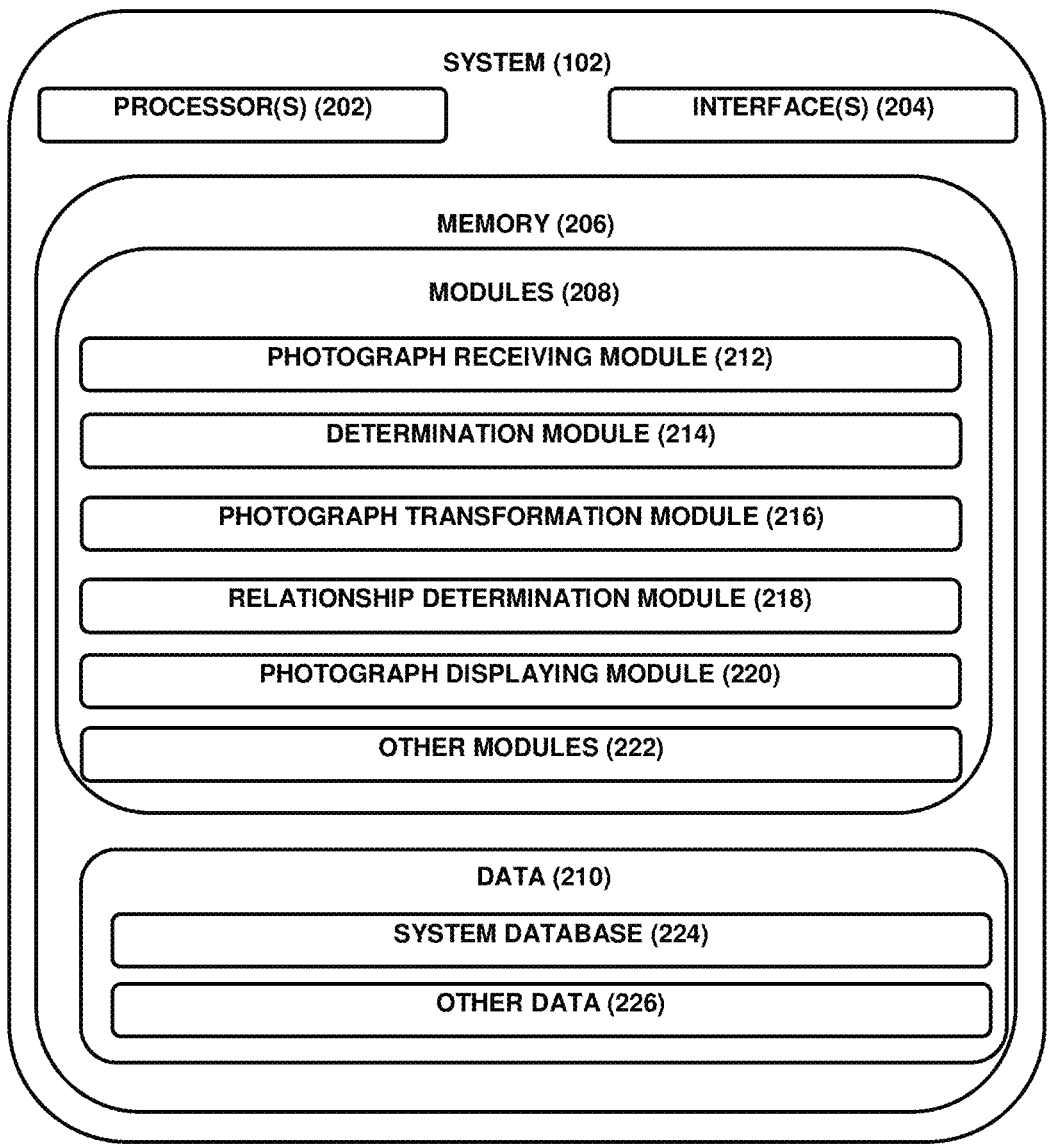
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a photograph receiving module 212, a determination module 214, a photograph transformation module 216, a relationship determination module 218, a photograph displaying module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

As there are various challenges observed in the existing art, the challenges necessitate the need to build the system 102 for facilitating a secure access to a photograph, comprising one or more faces of one or more persons, over a social networking platform. In order to authenticate the user, at first, a user may use the user device 104 to access the system 102 via the I/O interface 204. The user may register them using the I/O interface 204 to use the system 102. In one aspect, the user may access the I/O interface 204 of the system 102. The system 102 may employ the photograph receiving module 212, the determination module 214, the photograph transformation module 216, the relationship determination module 218, and the photograph displaying module 220. The detail functioning of the modules is described below with the help of figures.

In order to facilitate the secure access to the photograph over the social networking platform, the photograph receiving module 212 receives the photograph uploaded by an uploader. In one aspect, the photograph may comprise a set of human faces. It may be noted that each human face may be tagged with a person's name. The determination module 214 determines the set of human faces from the photograph and a set of pixels pertaining to each human face of the set of human faces. In one embodiment, the set of human faces may be determined by using at least one facial recognition technique.

In order to elucidate the functioning of the photograph receiving module 212 and the determination module 214, consider an example (1) where an uploader 'A' takes a photograph 'P' by using a camera of a mobile phone belonging to the uploader 'A'. The uploader 'A', upon capturing the photograph 'P', would like to publish on Facebook™ (a Social Networking Platform). It may be noted that the photograph comprises '3' persons including the uploader 'A' and '2' friends of the uploader 'A'. Once the photograph receiving module 212 receives the photograph 'P' from the uploader 'A', the photograph receiving module 212 uploads the photograph 'P' on Facebook™.

Figure 3:
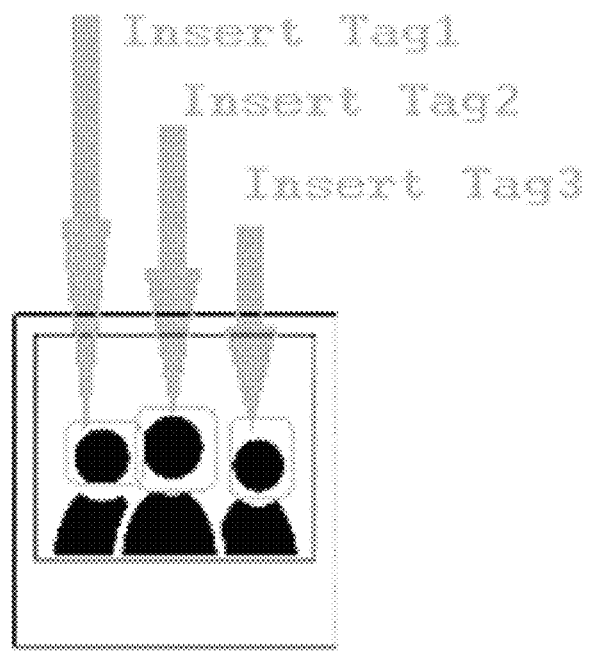
FIGS. 3, 4, 5, 6, and 7 illustrate examples, in accordance with an embodiment of the present subject matter.

Once uploaded, the determination module 214 determines individual faces from the Photograph 'P' and thereby derives a periphery around each face present in the photograph 'P'. It may be understood that the periphery derives around each face is determined as a Region of Interest (RoI). The determination module 214 further prompts the uploader 'A' to tag each face with a Person's name. Upon such request, the uploader 'A' tags 'Mike', 'John', and 'Andrew' in the Photograph 'P' wherein 'Mike' is the uploader 'A' and John', and 'Andrew' are friends of 'Mike', as shown in FIG. 3.

In one embodiment, the determination module 214 prompts the uploader to tag each face present in the photograph and continuously learns, over a period of time, the tagging of a face with a person's name. After learning for a predefined period of time and by accessing previously tagged images, the determination module 214 may recognize the faces present in the photograph and automatically perform the tagging for at least for a certain number of reoccurring faces.

Upon tagging each face present in the photograph and determination of the RoI pertaining to each face, the photograph transformation module 216 transforms the photograph into a transformed photograph. The photograph may be transformed upon masking the set of human faces present in the photograph. The set of human faces may be masked by at least one geometric shape placed over the periphery derived. Examples of the at least one geometric shape may include, but not limited to, a circle, a square, triangle, and a polygon. In one aspect, the set of human faces may be masked by applying at least one algorithm on the set of pixels associated to each face. It may be noted that the at least one algorithm defines how the set of pixels, pertaining to each face, is altered. Examples of the at least one algorithm may include, but not limited to, a Characteristic Transformation algorithm including RGB change algorithm and brightness change algorithm.

Figure 4:
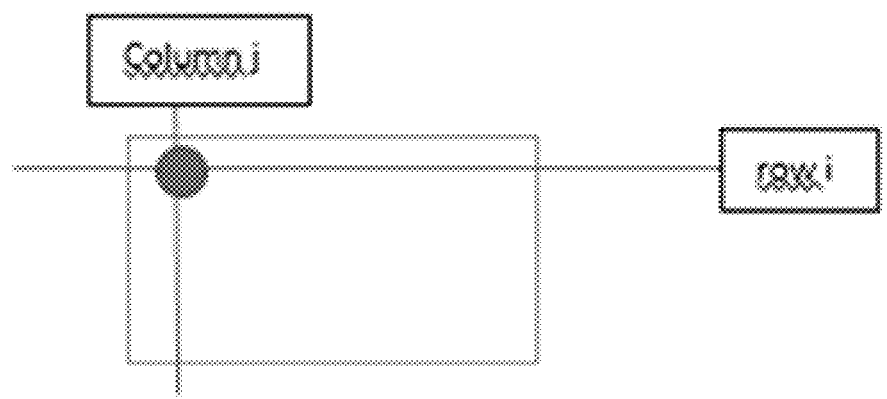

For example, considering the RoI: the set of pixels may be identified based on its coordinates inside the photograph, such as Pixel (I, j) as shown in FIG. 4. If the photograph transformation module 216 needs to modify a circular area centered on the identified face. Knowing the center coordinates and the circle ray, it may evaluate exactly all the pixels impacted during the transformation process. It may be noted that the characteristics of a pixel P (p, j) in the photograph may be transformed based the at least one algorithm.

In one embodiment, the photograph transformation module 216 may use the characteristics of a plurality of pixels (excluding the set of pixels) not involved in the transformation, for transforming the ones fitting into the circle area. In one aspect, the transformation of the set of pixels is determined based on difference in RGB values pertaining to the set of pixels and RGB values pertaining to the plurality of pixels, as referred in an equation (1) mentioned below.

$$\text{Transformed } RGB(i,j) = RGB(i,j) - RGB(x,y) \quad (1)$$

where RGB (i, j) indicates RGB values pertaining to the set of pixels, and wherein RGB (x, y) indicates RGB values pertaining to the plurality of pixels. Thus, in this manner, the photograph transformation module 216 transforms the photograph (including the set of human faces determined in the photograph) into the transformed photograph. In another embodiment, the photograph transformation module 216 may use any one of the below equations for transforming the photograph into a transformed photograph.

$$\text{Transformed Brightness}(i,j) = \text{Brightness}(i,j) - \text{Brightness}(x,y) \quad (2)$$

$$\text{Transformed Characteristic}(i,j) = \text{Original Characteristic}(i,j) f(\text{Characteristic}(x,y)) \quad (3)$$

Where 'f' is a function that may either be a function for addition, a function for subtraction, a function for multiplication, a function for division, a function for computing a percentage, or any other math function. 'x' and 'y' might be 'i+n' and 'j+m' or may be a fixed value or can range inside the RoI. It may be noted that the above algorithms or equations used for transforming the photograph are illustrated to enable the proposed the invention, the above algorithms or equations may also be used to transform the photograph by changing RGB values according to a fixed schema (R+10, G+0, B−20).

Thus, in the manner as aforementioned, the system facilitates to transform the photograph into the transformed photograph so that any unauthorized person having the access to the transformed photograph may not be able to use the faces of persons present in the photograph. On the other hand, if any authorized person wishes to access the photograph, the photograph transformation module 216 refers to metadata, associated to the transformed photograph, stored in the transformed image.

In one aspect, the metadata facilitates to re-transform the transformed photograph to the photograph. It may be noted that the metadata may comprise coordinates (X, Y) of the set of pixels pertaining to each human face, tagging of each human face with person's name, and the at least one algorithm applied to transform the set of pixels. In one embodiment, the metadata may be embedded with the transformed image when the photograph is uploaded by the uploader. In another embodiment, the metadata may be saved explicitly on a hard disk drive.

It may be noted that the metadata may be used by a downloader to reconstruct the photograph, from the transformed photograph, upon applying a back-transformation process. The back-transformation process may be applied when a downloader is allowed to view all the faces present in the photograph. To determine whether the downloader is allowed to view the faces, the relationship determination module 218 allows a downloader to access the transformed image. It may be noted that the downloader may either download the transformed photograph onto the hard disk drive or download the transformed photograph over the social networking platform.

Before displaying content of the transformed photograph, the relationship determination module 218 determines whether the downloader is authorized to access to the photograph. To determine the authorization for the downloader intended to access the photograph, the relationship determination module 218 further determines a relation between the downloader and one or more persons, tagged in the photograph, on a social networking platform. In one aspect, the relation may be determined upon referring to a set of predefined rules. In one example, the relation may be determined as family, friends, acquaintance, or explicit authorization to access the photograph, and familiarity index. In one embodiment, a list of authorization persons authorized to see one or more faces, present in the photograph, may also be included manually. In one example, ACL rule definition may state that: ALL can see A, then person B can be only seen by person Z and person W, person C can be seen by person Z, person W, person D and person B. Another example includes person F can be seen by all my friends belonging to group1 and group1 is defined inside the system database 224.

Subsequent to the determination of the relation between the downloader and the one or more persons tagged in the photograph, the photograph displaying module 220 displays a downloaded photograph either as the photograph or the transformed photograph to the downloader. In one aspect, the photograph displaying module 220 displays the downloaded photograph as the photograph upon unmasking one or more human faces of the set of human faces present in the photograph, when the relation is determined between the downloader and the one or more persons. The photograph displaying module 220, on the other hand, displays the downloaded photograph as the transformed photograph, when the relation is not determined between the downloader and the one or more persons thereby facilitating the secure access to the photograph over the social networking platform.

Referring to the example (1), same as aforementioned, considering that the downloader 'X' is a friend of 'Mike' on Facebook™ and the downloader 'X' is intended to access the photograph 'P' from Facebook™, the relationship determination module 218, initially, determines a relation between the downloader 'X' and 'Mike', 'John', and 'Andrew'. The relationship determination module 218 determines the relation upon referring to the metadata storing Person's name (i.e. 'Mike', 'John', and 'Andrew') present in the photograph 'P' and relationship between the downloader 'X' and 'Mike', 'John', and 'Andrew' from Facebook™. Upon referring to Facebook™, it may be understood that only 'Mike' is friends with downloader 'X'.

Then, based on the relation, the photograph displaying module 220 displays the downloaded photograph as a partially transformed photograph. The partially transformed photograph indicates that one or more faces of the set of faces (not all the faces) determined in the photograph 'P' are displayed to the downloader. Since 'Mike' is the only friend amongst 'Mike', 'John', and 'Andrew', the photograph displaying module 220 displays face of 'Mike' and blurs the faces of 'John', and 'Andrew' in the photograph 'P' displayed to the downloader 'X'.

Figure 5:
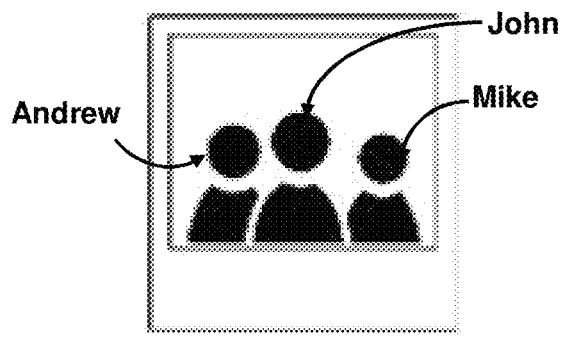
Figure 6:
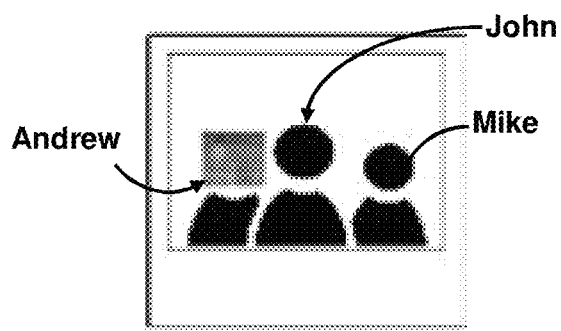
Figure 7:
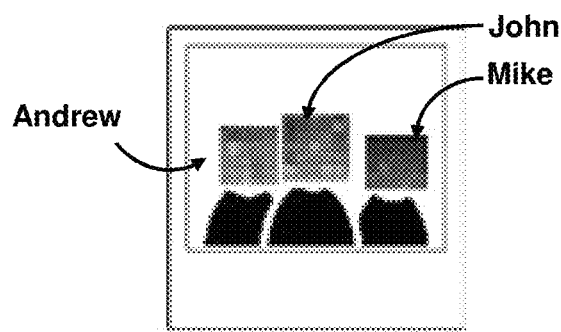

In an alternative embodiment, if the relationship determination module 218 determines that all 'Mike', 'John', and 'Andrew' are friends with downloader 'X', the photograph displaying module 220 displays faces of 'Mike', 'John', and 'Andrew' in the photograph 'P' displayed to the downloader 'X', as shown in the FIG. 5. In yet another embodiment, if the relationship determination module 218 determines that only 'Mike', and 'John' are friends with downloader 'X', the photograph displaying module 220 displays faces of 'Mike' and 'John' and blurred the face of 'Andrew' in the photograph 'P' displayed to the downloader 'X', as shown in the FIG. 6. In an alternative embodiment, if the relationship determination module 218 determines that none of 'Mike', 'John', and 'Andrew' are friends with downloader 'X', the photograph displaying module 220 displays blurred faces of 'Mike', 'John', and 'Andrew' in the photograph 'P' displayed to the downloader 'X', as shown in the FIG. 7.

By using the aforementioned methodology, the photographs on the social network cannot be misused. Only the authorized people may download and view the faces of people, present in the photograph, known to the authorized people. In one embodiment, the system 102 may further allow an administrator to immediately block access to all photographs uploaded on the system 102 by temporary changing the authorizations privileges. Thus, in this manner, the system 102 facilitates the secure access to the photograph over the social networking platform.

Figure 8A:
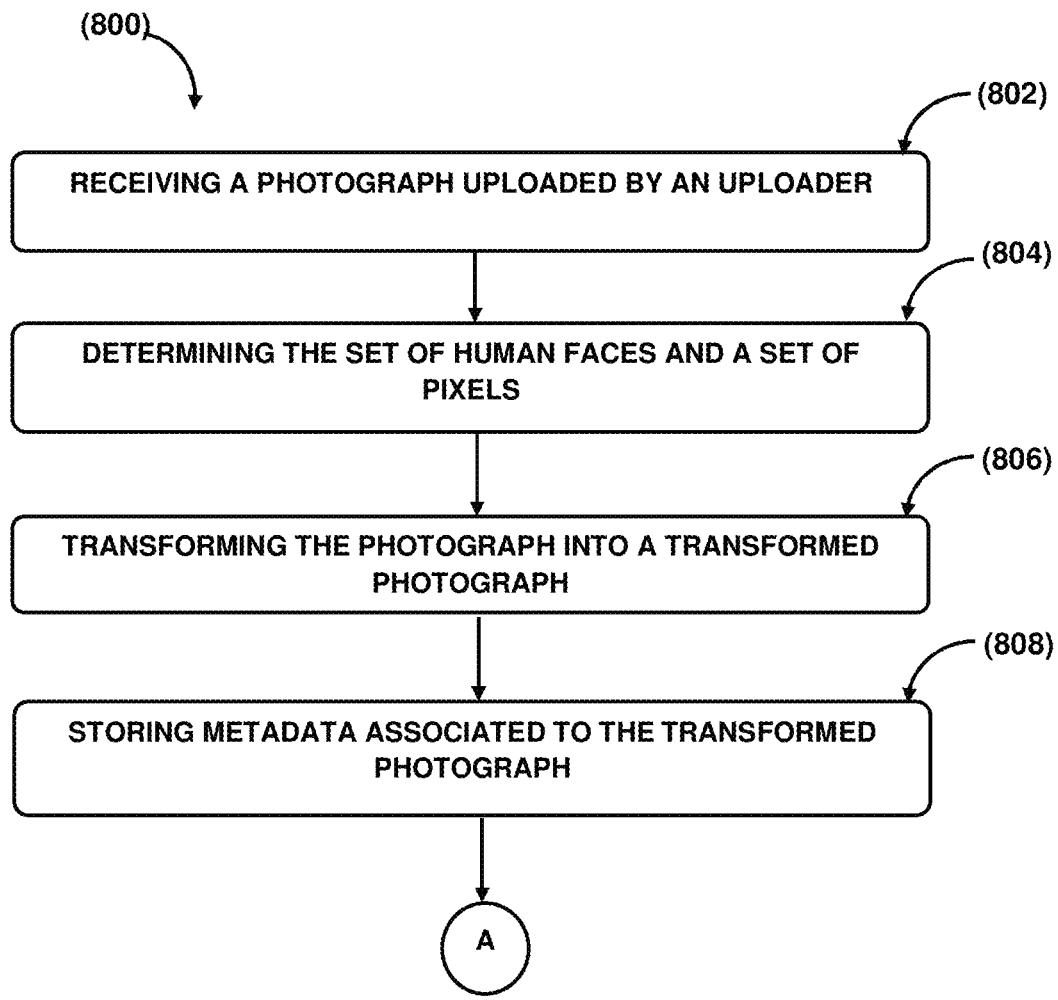
FIGS. 8A and 8B illustrate a method for facilitating the secure access to the photograph, in accordance with an embodiment of the present subject matter.
Figure 8B:
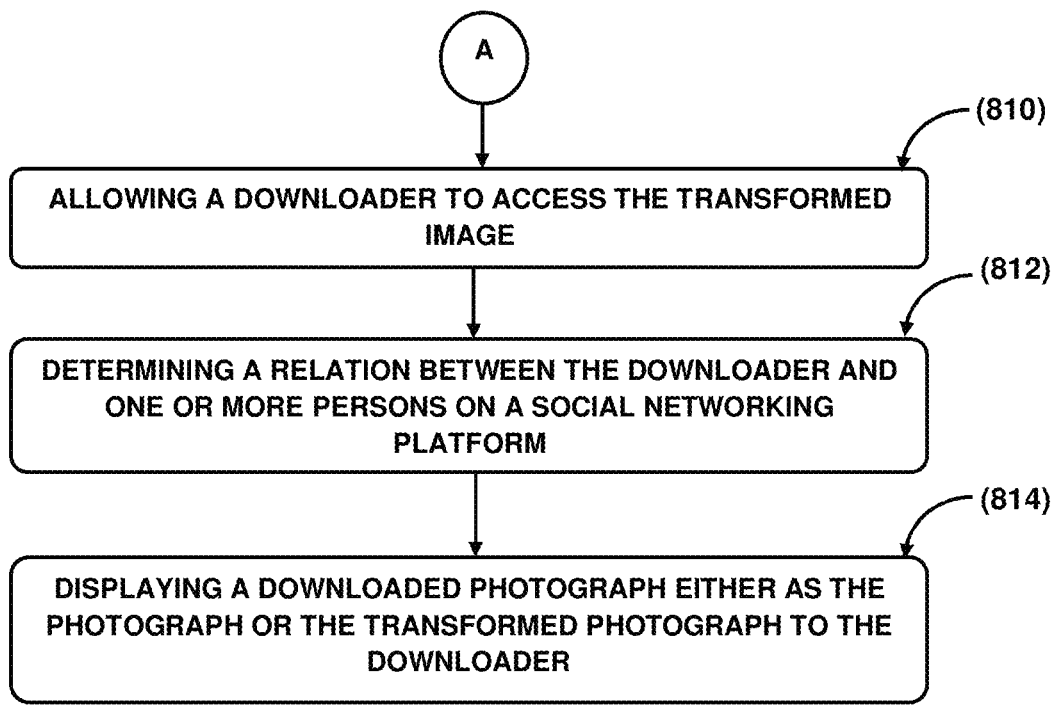

Referring now to FIG. 8, a method 800 for facilitating a secure access to a photograph, comprising one or more faces of one or more persons, over a social networking platform is shown, in accordance with an embodiment of the present subject matter. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the subject matter described herein. Furthermore, the method can be implemented in any suitable hardware, software, firmware, or combination thereof. However, for ease of explanation, in the embodiments described below, the method 800 may be considered to be implemented as described in the system 102.

At block 802, a photograph uploaded by an uploader may be received. In one aspect, the photograph may comprise a set of human faces. It may be noted that each human face may be tagged with a person's name In one implementation, the photograph may be received by the photograph receiving module 212.

At block 804, the set of human faces from the photograph and a set of pixels pertaining to each human face, of the set of human faces, may be determined. In one aspect, the set of human faces may be determined by using at least one facial recognition technique. In one implementation, the set of human faces and the set of pixels may be determined by the determination module 214.

At block 806, the photograph may be transformed into a transformed photograph upon masking the set of human faces present in the photograph. In one aspect, the set of human faces may be masked by applying at least one algorithm on the set of pixels associated to each face. In one implementation, the photograph may be transformed by the photograph transformation module 216.

At block 808, metadata associated to the transformed photograph may be stored in the transformed image. In one aspect, the metadata facilitates to re-transform the transformed photograph to the photograph. In one implementation, the metadata may be stored by the photograph transformation module 216.

At block 810, a downloader may be allowed to access the transformed image. In one implementation, the downloader may be allowed by the relationship determination module 218.

At block 812, a relation between the downloader and one or more persons, tagged in the photograph may be determined on a social networking platform. In one aspect, the relation may be determined upon referring to a set of predefined rules. In one aspect, the relation between the downloader and the one or more persons may be determined by the relationship determination module 218.

At block 814, a downloaded photograph may be displayed either as the photograph or the transformed photograph to the downloader. In one aspect, the downloaded photograph may be displayed as the photograph upon unmasking one or more human faces of the set of human faces present in the photograph, when the relation is determined between the downloader and the one or more persons. The downloaded photograph, on the other hand, is displayed as the transformed photograph, when the relation is not determined between the downloader and the one or more persons thereby facilitating a secure access to the photograph over the social networking platform. In one implementation, the downloaded photograph may be displayed by the photograph displaying module 220.

Exemplary embodiments discussed above may provide certain advantages. Though not required to practice aspects of the disclosure, these advantages may include those provided by the following features.

Some embodiments enable a system and a method to facilitate secure sharing of a photograph even if the photograph is made public over a network.

Some embodiments enable a system and a method to secure content of the photograph from unauthorized people thereby avoiding any misuse, even if the photo is downloaded by such unauthorized people.

Although implementations for methods and systems for facilitating a secure access to a photograph, comprising one or more faces of one or more persons, over a social networking platform have been described in language specific to structural features and/or methods, it is to be understood that the appended claims are not necessarily limited to the specific features or methods described. Rather, the specific features and methods are disclosed as examples of implementations for facilitating the secure access to the photograph.

The invention claimed is:

1. A method for facilitating a secure access to a photograph, comprising one or more faces of one or more persons, over a social networking platform, the method comprising: receiving, by a processor, a photograph uploaded by an uploader, wherein the photograph comprises a set of human faces, and wherein each human face is tagged with a person's name; determining, by the processor, the set of human faces from the photograph by using at least one facial recognition technique, and a set of pixels pertaining to each human face of the set of human faces; transforming, by the processor, the photograph into a transformed photograph upon masking the set of human faces present in the photograph, wherein the set of human faces is masked by applying at least one algorithm on the set of pixels associated to each face, and wherein the at least one algorithm comprises a Characteristic Transformation algorithm including RGB change algorithm and brightness change algorithm: and storing, by the processor, metadata associated to the transformed photograph, wherein the metadata facilitates to re-transform the transformed photograph to the photograph, and wherein the metadata is stored in the transformed photographor stored on a hard disk drive; allowing, by the processor, a downloader to access the transformed photograph; determining, by the processor, a relation between the downloader and one or more persons, tagged in the photograph, on a social networking platform, whe rein the relation is determined upon referring to a set of predefined rules; allowing, by the processor, the downloader to download the transformed photograph onto a hard disk drive, or download the transformed photograph over the social networking platform: and reconstruct the photograph, from the transformed photograph, upon applying a back-transformation process, when the relation is determined between the downloader and the one or more persons, and wherein the back-transformation process uses the metadata to reconstruct the photograph, from the transformed photograph; and displaying, by the processor, a downloaded photograph either as the photograph or the transformed photograph to the downloader, wherein the downloaded photograph is displayed as the photograph upon unmasking one or more human faces of the set of human faces present in the photograph, when the relation is determined between the downloader and the one or more persons, and wherein the downloaded photograph is displayed as the transformed photograph, when the relation is not determined between the downloader and the one or more persons thereby facilitating a secure access to the photograph over the social networking platform.

2. The method as claimed in claim 1, wherein the set of human faces is masked by at least one geometric shape comprising a circle, a square, triangle, and a polygon.

3. The method as claimed in claim 1, wherein the metadata comprises coordinates (X, Y) of the set of pixels pertaining to each human face, tagging of each human face with person's name, and the at least one algorithm applied to transform the set of pixels.

4. The method as claimed in claim 1, wherein the relation is determined as family, friends, acquaintance.

5. A system for facilitating a secure access to a photograph, comprising one or more faces of one or more persons, over a social networking platform, the system comprising: a processor; and a memory coupled to the processor, wherein the processor is capable of executing a plurality of modules stored in the memory, and wherein the plurality of modules comprising: a photograph receiving module for receiving a photograph uploaded by an uploader, wherein the photograph comprises a set of human faces, and wherein each human face is tagged with a person's name; a determination module for determining the set of human faces from the photograph by using at least one facial recognition technique, and a set of pixels pertaining to each human face of the set of human faces; a photograph transformation module for transforming the photograph into a transformed photograph upon masking the set of human faces present in the photograph, wherein the set of human faces is masked by applying at least one algorithm on the set of pixels associated to each face, and wherein the at least one algorithm comprises a Characteristic Transformation algorithm including RGB change algorithm and brightness change algorithm: and storing metadata associated to the transformed photograph, wherein the metadata facilitates to re-transform the transformed photograph to the photograph, and wherein the metadata is stored in the transformed photographor stored on a hard disk drive: a relationship determination module for allowing a downloader to access the transformed photograph, and determining a relation between the downloader and one or more persons, tagged in the photograph, on a social networking platform, wherein the relation is determined upon referring to a set of predefined rules, and allowing the downloader to download the transformed photograph onto a hard disk drive, or download the transformed photograph over the social networking platform; and reconstruct the photograph, from the transformed photograph, upon applying a back-transformation process, when the relation is determined between the downloader and the one or more persons, and wherein the back-transformation process uses the metadata to reconstruct the photograph, from the transformed photograph; and a photograph displaying module for displaying a downloaded photograph either as the photograph or the transformed photograph to the downloader, wherein the downloaded photograph is displayed as the photograph upon unmasking one or more human faces of the set of human faces present in the photograph, when the relation is determined between the downloader and the one or more persons, and wherein the downloaded photograph is displayed as the transformed photograph, when the relation is not determined between the downloader and the one or more persons thereby facilitating a secure access to the photograph over the social networking platform.

6. The system as claimed in claim 5, wherein the set of human faces is masked by at least one geometric shape comprising a circle, a square, triangle, and a polygon.

7. The as claimed in claim 5, wherein the metadata comprises coordinates (X, Y) of the set of pixels pertaining to each human face, tagging of each human face with person's name, and the at least one algorithm applied to transform the set of pixels.

8. A non-transitory computer readable medium embodying a program executable in a computing device for facilitating a secure access to a photograph, comprising one or more faces of one or more persons, over a social networking platform, the program comprising a program code: a program code for receiving a photograph uploaded by an uploader, wherein the photograph comprises a set of human faces, and wherein each human face is tagged with a person's narre; a program code for determining the set of human faces from the photograph by using at least one facial recognition technique, and a set of pixels pertaining to each human face of the set of human faces; a program code for transforming the photograph into a transformed photograph upon masking the set of human faces present in the photograph, wherein the set of human faces is masked by applying at least one algorithm on the set of pixels associated to each face, and wherein the at least one algorithm comprises a Characteristic Transformation algorithm including RGB change algorithm and brightness change algorithm; and a program code for storing metadata associated to the transformed photograph of the photograph, wherein the metadata facilitates to re-transform the transformed photograph to the photograph, and wherein the metadata is stored in the transformed photograph or stored on a hard disk drive; a program code for allowing a downloader to access the transformed image; a program code for determining a relation between the downloader and one or more persons, tagged in the photograph, on a social networking platform, wherein the relation is determined upon referring to a set of predefined rules; a program code for allowing the downloader to download the transformed photograph onto a hard disk drive, or download the transformed photograph over the social networking platform; and a program code for reconstructing the photograph, from the transformed photograph; upon applying a back-transformation process, when the relation is determined between the downloader and the one or more persons, and wherein the back-transformation process uses the metadata to reconstruct the photograph, from the transformed photograph; and a program code for displaying a downloaded photograph either as the photograph or the transformed photograph to the downloader, wherein the downloaded photograph is displayed as the photograph upon unmasking one or more human faces of the set of human faces present in the photograph, when the relation is determined between the downloader and the one or more persons, and wherein the downloaded photograph is displayed as the transformed photograph, when the relation is not determined between the downloader and the one or more persons thereby facilitating a secure access to the photograph over the social networking platform.

\* \* \* \* \*